US005624969A

United States Patent [19]
Seifert et al.

[11] Patent Number: 5,624,969
[45] Date of Patent: Apr. 29, 1997

[54] PRODUCTION OF RIGID FOAMS BASED ON ISOCYANATE

[75] Inventors: Holger Seifert, Freital; Renate Hempel; Gottfried Knorr, both of Schwarzheide; Udo Rotermund, Ortrand, all of Germany

[73] Assignee: BASF Aktiengesellschaft, Ludwigshafen, Germany

[21] Appl. No.: 677,744

[22] Filed: Jul. 10, 1996

[30] Foreign Application Priority Data

Jul. 25, 1995 [DE] Germany ............ 195 26 979.9

[51] Int. Cl.⁶ ............................................. C08J 9/14
[52] U.S. Cl. ............................ 521/117; 521/131
[58] Field of Search ........................... 521/117, 131

[56] References Cited

U.S. PATENT DOCUMENTS

| | | |
|---|---|---|
| 3,620,987 | 11/1971 | McLaughlin et al. . |
| 3,887,501 | 6/1975 | Narayan et al. . |
| 3,922,238 | 11/1975 | Narayan et al. . |
| 4,029,611 | 6/1977 | Cenker et al. . |
| 5,039,442 | 8/1991 | Swan et al. . |
| 5,177,117 | 1/1993 | Coe et al. ............................ 521/117 |
| 5,189,068 | 2/1993 | Boehme et al. .................... 521/117 |
| 5,336,696 | 8/1994 | Ashida . |
| 5,470,501 | 11/1995 | Fishback et al. ................... 521/117 |
| 5,523,332 | 6/1996 | Fishback et al. ................... 521/117 |

FOREIGN PATENT DOCUMENTS

| | | |
|---|---|---|
| A2281 | 6/1979 | European Pat. Off. . |
| 0379268A2 | 7/1990 | European Pat. Off. . |
| 0421269A2 | 4/1991 | European Pat. Off. . |
| 0463479A2 | 1/1992 | European Pat. Off. . |
| A253029 | 6/1912 | Germany . |
| 211121 | 11/1982 | Germany . |
| A4341973 | 12/1993 | Germany . |
| 2271996 | 5/1994 | United Kingdom . |
| WO91/18966 | 12/1991 | WIPO . |
| WO92/06800 | 4/1992 | WIPO . |

*Primary Examiner*—Morton Foelak
*Attorney, Agent, or Firm*—Fernando A. Borrego

[57] ABSTRACT

In a process for producing rigid foams based on isocyanate, the blowing agent used is a mixture of at least one low-boiling hydrocarbon having from 3 to 7 carbon atoms, low molecular weight monohydric alcohols containing primary or secondary hydroxyl groups and having from 1 to 4 carbon atoms, and, if desired, the carbon dioxide formed from water and isocyanate. The rigid foams can be used as insulation material.

18 Claims, No Drawings

PRODUCTION OF RIGID FOAMS BASED ON ISOCYANATE

The invention relates to a process for producing rigid foams based on isocyanate, wherein the blowing agent used is a mixture of at least one low-boiling hydrocarbon having from 3 to 7 carbon atoms, low molecular weight monohydric alcohols containing primary or secondary hydroxyl groups and having from 1 to 4 carbon atoms and, if desired, the carbon dioxide formed from water and isocyanate, the blowing agent mixture used according to this process and the use of the resulting rigid foams as insulation material.

Rigid foams based on isocyanate, in particular polyurethane and isocyanurate foams, have been known for a long time and are used primarily for heat or cold insulation, e.g. in refrigeration appliances, in building, in hot water tanks and long-distance heating pipes. Even very recently, the blowing agents used for producing these foams have been chlorofluorocarbons (CFCs), particularly trichlorofluoromethane. These CFCs, owing to their destructive action on the global ozone layer, have to be replaced by materials which do not have this ozone depletion potential (ODP) and have a global warming potential (GWP) whch is as low as possible. In addition, it has to be expected that, at least in a few years, only halogen-free blowing agents or blowing agent mixtures will be permitted.

For these reasons, hydrocarbons have been proposed as the blowing agents of the future. Hydrocarbons which play a prominent role are the isomers of pentane which, owing to their relatively low boiling points, are very suitable as blowing agents for producing rigid foams based on isocyanate.

It has been found that cyclopentane gives, in comparison with n- and isopentane, foams having a lower thermal conductivity (EP-A-0 421 269) and therefore cyclopentane or its mixtures with materials boiling at below 35° C. represent the best halogen-free blowing agent variants up to now. Cyclohexane too is proposed in EP-A-0 421 269 as blowing agent similar to cyclopentane.

In the last 2 years, cyclopentane has already become established in the European refrigeration appliance industry. However, for cost reasons and because of the somewhat stronger blowing action, n-pentane or isopentane and other low-boiling hydrocarbons are also used as blowing agents, although these give poorer thermal conductivity values than cyclopentane.

Although use of these hydrocarbons, including cyclopentane, gives foams which are very usable for insulation purposes, such foams still have disadvantages compared with the products blown by means of CFCs, particularly in respect of the flow properties of the foaming mixture.

The use of polar low-boiling and even relatively high-boiling compounds in admixture with cyclopentane, for example formic esters or acetic esters, low-boiling ketones or ethers, as described in U.S. Pat. No. 5,336,696, does lead to a somewhat improved flowability and blowing action, but due to the strongly plasticizing effects of the materials claimed in that invention on the rigid foam framework of isocyanate adducts gives catastrophic shrinkage phenomena, especially in the case of foams in the industrially important density range below 50 kg/m$^3$.

Monohydric alcohols have not yet been used in combination with halogen-free hydrocarbons as auxiliaries for improving the blowing action and the flow behavior in the production of rigid foams based on isocyanate.

Among the monohydric alcohols, methanol has only been used as constituent of specific catalysts for producing high-temperature-resistant carbodiimide foams (DT-A-253 029, U.S. Pat. Nos. 3,887,501, 4,029,611, EP-A-2281, U.S. Pat. No. 3,922,238) or polyamide foam (U.S. Pat. No. 3,620,987) from isocyanates.

It is also known that low molecular weight alcohols can be introduced into the isocyanate, with prepolymer formation occurring by reaction to give the urethane (e.g. DE-A-43 41 973). This improves the compatibility of the polyol component with the isocyanate component. Since in this procedure the alcohol is already quantitatively chemically bound to the isocyanate in the form of urethane before the foaming reaction, no blowing action is to be expected.

GB-A-2 271 996 describes the combination of dibutyl phthalate and ethanol in a molar ratio of from 1:1.5 to 1:4 as blowing agent for the production of a foam from paper industry wastes and isocyanates. No details of quality parameters are given. In normal quality rigid foams based on isocyanate, it is known that the presence of only small amounts of plasticizer results in strong, unacceptable shrinkage phenomena. Such a mixture is therefore unusable as blowing agent for normal rigid foams based on isocyanate.

EP-A-0 463 479 describes the use of tertiary alcohols, in particular tertiary butanol, in combination with water as blowing agent. The purpose is the production of rigid integral foams having a smooth, densified, pore-free surface in the absence of physically acting blowing agents. The tertiary butanol here reacts with the isocyanate groups with the elimination of carbon dioxide to give butene. The tertiary butanol thus acts as a chemical blowing agent. The tertiary alcohols differ in this way from the other monohydric alcohols which not only have a physical blowing action but can also be incorporated into the foam framework by means of their hydroxyl groups and can influence the properties.

Also claimed are various mixtures of HCFCs (at least one hydrogen in the molecule of the chlorofluorocarbon compound) or chlorinated hydrocarbons with low molecular weight monohydric alcohols as cleaners, for which the use as blowing agent for rigid polyurethane foams is sometimes also mentioned (EP-A-0 379 268, U.S. Pat. No. 5,039,442, WO 91/18966, WO 92/06800, DD 211 121). Among these documents, only WO 92/06800 and DD 211 121 describe examples for producing rigid polyurethane foam using alcohol/chloro-fluoro compounds in admixture as blowing agent. In addition, DD 211 121 claims only the joint addition of water and alcohol in a molar ratio of greater than 4 for densities above 160 kg/m$^3$. The alcohol concentration in the total foaming composition is there always less than 0.5%. Under these conditions, the alcohol has no blowing action in addition to that of the water. The fact that the relatively high-boiling alcohols described in WO 92/06800 have any blowing action at all is attributed to specific interactions between alcohol and CFC (azeotrope formation). However, these halogen-containing hydrocarbons will in future not be permitted as blowing agents (as already mentioned above), not even in combination with alcohols.

From the use of low molecular weight alcohols in admixture with halogen-containing blowing agents it is in no way possible to deduce the use of mixtures of alcohols and halogen-free hydrocarbons, since the physicochemical structure of halogen-free hydrocarbons differs considerably from that of the halogen-containing carbon compounds. Thus, for example, the dipole moments of the C-F and C-Cl bonds are 1.5 and 1.7 debye respectively, but the dipole moment of the C-H bond is only 0.2 debye (Rudolf Brdička, Grundlagen der Physikalischen Chemie, 4th edition, VEB Deutscher Verlag der Wissenschaften, Berlin 1963, page 855) and accordingly completely different interactions between alcohols and halogen-containing carbon compounds are to be expected in comparison with alcohols and halogen-free hydrocarbons.

It is an object of the present invention to produce rigid foams based on isocyanate, while largely avoiding the stated disadvantages which occur when the above-described blowing agents or blowing agent mixtures are used. In particular, the blowing action and the flow behavior in the foaming reaction mixture are to be considerably improved.

We have found that this object is achieved by using low molecular weight monohydric alcohols containing primary or secondary hydroxyl groups together with cyclopentane and/or other low-boiling hydrocarbons, if desired in combination with water, as blowing agent.

The invention accordingly provides a process for producing rigid foams based on isocyanate by reacting a) organic and/or modified organic polyisocyanates with b) at least one relatively high molecular weight compound containing at least two reactive hydrogen atoms and, if desired, c) low molecular weight chain extenders and/or crosslinkers in the presence of d) blowing agents, e) catalysts and, if desired, f) further auxiliaries and/or additives, wherein the blowing agent used is a mixture of at least one low-boiling hydrocarbon having from 3 to 7 carbon atoms and low molecular weight monohydric alcohols containing primary or secondary hydroxyl groups and having from 1 to 4 carbon atoms, if desired in combination with the carbon dioxide formed from water and isocyanate.

The invention also provides a blowing agent mixture for the production of rigid foams based on polyisocyanate and provides for the use of the rigid foams as insulation material.

The use of monohydric alcohols in combination with halogen-free hydrocarbons surprisingly gives a considerable additional blowing action, combined with considerably improved flow of the foaming mixture without the above-described disadvantages associated with the use of increased amounts of hydrocarbons, increased amounts of water or low-boiling esters, ketones and ethers. According to the prevailing opinion up to now, monofunctional hydrogen-active materials impair both the processing properties, such as the curing process, and the final properties of the rigid foams based on isocyanate by interfering in the crosslinking reaction. It is therefore totally surprising that simple measures based on modifications of current formulations not only counteract these disadvantages but in most cases lead to property improvements.

The blowing agent mixture to be used according to the present invention preferably contains the low-boiling hydrocarbons having from 3 to 7 carbon atoms in an amount of from 0.1 to 12% by mass, particularly preferably from 4 to 8% by mass, and preferably contains the low molecular weight monohydric alcohols containing primary or secondary hydroxyl groups and having from 1 to 4 carbon atoms in an amount of from 0.1 to 6% by mass, particularly preferably from 2 to 4% by mass, in each case based on the total amount of the foam.

As low-boiling hydrocarbons having from 3 to 7 carbon atoms, preference is given to using cyclopentane, n-pentane and isopentane. These hydrocarbons can be used alone or in admixture with one another.

Suitable low molecular weight monohydric alcohols containing primary or secondary hydroxyl groups and having from 1 to 4 carbon atoms are, in particular, methanol, ethanol, n-propanol, isopropanol and the isomers of butanol, except for tertiary butanol. These alcohols can be used alone or in admixture with one another.

The rigid foams based on isocyanate are produced by reacting a) organic and/or modified organic polyisocyanates with b) at least one relatively high molecular weight compound containing at least two reactive hydrogen atoms and, if desired, c) low molecular weight chain extenders and/or crosslinkers in the presence of d) the blowing agent mixture of the present invention and e) catalysts and, if desired f) customary further auxiliaries and/or additives in a manner known per se.

To produce the rigid foams based on isocyanate by the process of the present invention, use is made, with the exception of the blowing agents (d), of the formative components known per se, about which the following details may be given.

a) Suitable organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and any mixtures of these isomers, 1-isocyanato-3,3,5-trimethyl-5-isocyanatomethylcyclohexane (isophorone diisocyanate), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples are: organic, preferably aromatic, polyisocyanates containing urethane groups and having NCO contents of from 33.6 to 15% by weight, preferably from 31 to 21% by weight, based on the total weight, for example diphenylmethane 4,4'-diisocyanate modified with low molecular weight diols, triols, dialkylene glycols, trialkylene glycols or polyoxyalkylene glycols having molecular weights of up to 6000, in particular having molecular weights of up to 1500, modified diphenylmethane 4,4'- and 2,4'-diisocyanate mixtures, or modified raw MDI or tolylene 2,4- or 2,6-diisocyanate, with examples of dialkylene or polyoxyalkylene glycols, which can be used individually or as mixtures, being: diethylene glycol, dipropylene glycol, polyoxyethylene glycols, polyoxypropylene glycols and polyoxypropylene-polyoxyethylene glycols and the corresponding triols and/or tetrols. Also suitable are NCO-containing prepolymers having NCO contents of from 25 to 3.5% by weight, preferably from 21 to 14% by weight, based on the total weight, prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other suitable modified polyisocyanates are liquid polyisocyanates containing carbodiimide groups and/or isocyanurate rings and having NCO contents of from 33.6 to 15% by weight, preferably from 31 to 21% by weight, based on the total weight, for example based on diphenylmethane 4,4'-, 2,4'- and/or 2,2'-diisocyanate and/or tolylene 2,4- and/or 2,6-diisocyanate.

The modified polyisocyanates can, if desired, be mixed with one another or with unmodified organic polyisocyanates such as diphenylmethane 2,4'- and/or 4,4'-diisocyanat, raw MDI, tolylene 2,4- and/or 2,6-diisocyanate.

Polyisocyanates which have been found to be particularly useful are diphenylmethane diisocyanate isomer mixtures or raw MDI having a diphenylmethane diisocyanate isomer content of from 33 to 55% by mass and polyisocyanate mixtures containing urethane groups and based on diphenylmethane diisocyanate and having an NCO content of from 15 to 33% by mass.

b) Suitable compounds containing at least two hydrogen atoms which are reactive toward isocyanates are compounds bearing two or more reactive groups selected from among OH groups, SH groups, NH groups, $NH_2$ groups and CH-acid groups such as β-diketo groups in the molecule.

Use is advantageously made of those having a functionality of from 2 to 8, preferably from 2 to 6, and a molecular weight of from 300 to 8000, preferably from 400 to 4000. Compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols specified. Preference is given to using polyester polyols and/or polyether polyols. The hydroxyl number of the polyhydroxy compounds is here generally from 100 to 850 and preferably from 200 to 600.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid deritatives such as dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols specified, in particular mixtures of 1,4-butanediol, 1,5-pentanediol and 1,6-hexanediol. It is also possible to use polyester polyols from lactones, e.g. ε-caprolactone, or hydroxycarboxylic acids, e.g. ω-hydroxycaproic acid.

To prepare the polyester polyols, the organic, for example aromatic and preferably aliphatic, polycarboxylic acids and/or derivatives and polyhydric alcohols can be polycondensed in the absence of a catalyst or preferably in the presence of esterification catalysts, advantageously in an atmosphere of inert gas such as nitrogen, carbon monoxide, helium, argon, etc., in the melt at from 150° to 250° C., preferably from 180° to 220° C., if desired under reduced pressure, to the desired acid number which is advantageously less than 10, preferably less than 2. According to a preferred embodiment, the esterification mixture is polycondensed at the abovementioned temperatures to an acid number of from 80 to 30, preferably from 40 to 30, at atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 300 to 3000, preferably from 350 to 2000 and in particular from 400 to 600.

However, particularly preferred polyols are polyether polyols which are prepared by known methods, for example by anionic polymerization using alkali metal hydroxides, e.g. sodium or potassium hydroxide, or alkali metal alkoxides, e.g. sodium methoxide, sodium or potassium ethoxide or potassium isopropoxide, as catalysts with addition of at least one initiator molecule containing from 2 to 8, preferably from 2 to 6, reactive hydrogen atoms in bonded form or by cationic polymerization using Lewis acids such as antimony pentachloride, boron fluoride etherate, etc. or bleaching earth as catalysts from one or more alkylene oxides having from 2 to 4 carbon atoms in the alkylene radical. suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Suitable initiator molecules are for example: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated or dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane.

Other suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric, alcohols such as ethanediol, 1,2-propanediol and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols, preferably polyoxypropylene and polyoxypropylene-polyoxyethylene polyols, have a functionality of preferably from 2 to 6 and in particular from 2 to 4 and molecular weights of from 300 to 8000, preferably from 400 to 1500 and in particular from 420 to 1100, and suitable polyoxytetramethylene glycols have a molecular weight up to about 3500.

Other suitale polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, for example in a weight ratio of from 90:10 to 10:90, preferably from 70:30 to 30:70, advantageously in the abovementioned polyether polyols by a method similar to that given in German patents 11 11 394, 12 22 669 (U.S. Pat. Nos. 3,304,273, 3,383,351, 3,523,093), 11 52 536 (GB 10 40 452) and 11 52 537 (GB 987 618), and also polyether polyol dispersions which contain as dispersed phase, usually in an amount of from 1 to 20% by weight, preferably from 2 to 25% by weight: for example, polyureas, polyhydrazides, polyurethanes containing bonded tert-amino groups and/or melamine and are described, for example, in EP-B-011 752 (U.S. Pat. No. 4,304,708), U.S. Pat. No. 4,374,209 and DE-A-32 31 497.

Like the polyester polyols, the polyether polyols can be used individually or in the form of mixtures. They can also be mixed with the graft polyether polyols or polyester polyols, or with the hydroxyl-containing polyesteramides, polyacetals, polycarbonates and/or polyetherpolyamines.

Suitable hydroxyl-containing polyacetals are, for example, the compounds which can be prepared from glycols, for example diethylene glycol, triethylene glycol, 4,4'-dihydroxyethoxydiphenyldimethylmethane and hexanediol, and formaldehyde. Suitable polyacetals can also be prepared by polymerization of cyclic acetals.

Suitable hydroxyl-containing polycarbonates are those of a type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, e.g. diphenyl carbonate, or phosgene.

The polyesteramides include, for example, the primarily linear condensates obtained from polybasic, saturated and/or unsaturated carboxylic acids, or their anhydrides and polyfunctional saturated and/or unsaturated amino alcohols or mixtures of polyhydric alcohols and amino alcohols and/or polyamines.

Suitable polyetherpolyamines can be prepared from the abovementioned polyether polyols by known metehods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE 12 15 373).

c) The rigid foams based on isocyanate can be produced with or without concomitant use of chain extenders and/or crosslinkers. However, the addition of chain extenders, crosslinkers or, if desired, mixtures thereof can be advantageous for modifying the mechanical properties, e.g. the hardness. Chain extenders and/or crosslinkers used are diols and/or triols having molecular weights of less than 400, preferably from 60 to 300. Examples of suitable chain extenders and/or crosslinkers are aliphatic, cycloaliphatic and/or araliphatic diols having from 2 to 14, preferably from 4 to 10, carbon atoms, for example ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are used for producing the rigid foams based on isocyanate, these are advantageously used in an amount of from 0 to 20% by weight, preferably from 2 to 8% by weight, based on the weight of the polyol compound (b).

d) The blowing agent (d) used is the above-described blowing agent mixture according to the present invention comprising at least one low-boiling hydrocarbon having from 3 to 7 carbon atoms and low molecular weight monohydric alcohols having from 1 to 4 carbon atoms. It is advantageously introduced into the polyol component consisting of the formative components (b), (e) and, if used, (c) and (f). However, it is also possible to meter a mixture of the low-boiling hydrocarbons and the low molecular weight monohydric alcohols separately from the polyol component into the mixing head of a foaming machine. Likewise, the low molecular weight monohydric alcohol or the alcohol mixture can be metered alone into the mixing head using this technique, while the remaining blowing agent has previously been dissolved in the polyol component, or vice versa, the low-boiling hydrocarbons can be fed to the mixing head separately from a mixture of polyol component and low molecular weight monohydric alcohols.

The blowing agent mixture of the present invention can be used alone or preferably in combination with water.

e) Catalysts (e) for producing the rigid foams based on isocyanate are, in particular, compounds which strongly accelerate the reaction of the compounds of the component (b) and, if used, (c) containing reactive hydrogen atoms, in particular hydroxyl groups, with the organic, modified or unmodified polyisocyanates (a). However, the isocyanate groups can also be reacted with one another by means of suitable catalysts (e), with isocyanurate structures preferably being formed in addition to the adducts of isocyanates (a) with the compounds having hydrogen-active groups (b).

Catalysts used are thus, in particular, those materials which accelerate the reactions of the isocyanates, in particular urethane, urea and isocyanurate formation.

For this purpose, preference is given to tertiary amines, tin and bismuth compounds, alkali metal and alkaline earth metal carboxylates, quaternary ammonium salts, s-hexahydrotriazines and tris(dialkylaminomethyl)phenols.

Examples of suitable catalysts are organic metal compounds, preferably organic tin compounds such as tin (II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide, and alkali metal alkoxides such as sodium methoxide and potassium isopropoxide, and also alkali metal salts of long-chain fatty acids having from 10 to 20 carbon atoms and, if desired, lateral OH groups. Preference is given to using from 0.001 to 5% by weight, in particular from 0.05 to 2% by weight, of catalyst or catalyst combination, based on the weight of the component (b).

f) If desired, it is also possible to incorporate auxiliaries and/or additives (f) into the reaction mixture for producing the rigid foams based on isocyanate. Examples which may be mentioned are surface-active substances, foam stabilizers, cell regulators, flame retardants, fillers, dyes, pigments, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylammonium oleate, diethanolammonium stearate, diethanolammonium ricinoleate, salts of sulfonic acids, e.g. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Also suitable for improving the emulsifying action, the cell structure and/or stabilizing the foam are the above-described oligomeric acrylates having polyoxyalkylene and fluoroalkane radicals as side groups. The surface-active substances are usually used in amounts of from 0.01 to 5 parts by weight, based on 100 parts by weight of the component (b).

As flame retardants, it is possible to use all materials customary for this application in polyurethane chemistry. Use is predominantly made of halogen and phosphorus compounds, for example esters of orthophosphoric acid and methanephosphonic acid, e.g. tris(2-chloropropyl) phosphate or diethyl bis(2-hydroxyethyl) aminomethylphosphonate. Since the rigid foam based on isocyanate is in future to be produced using only halogen-free additives, these flame retardants also have to be halogen-free. Suitable substances for this purpose are, for example, derivatives of phosphoric acid, phosphorous acid or phosphonic acid which are reactive toward isocyanate, if desired in combination with unreactive liquid and/or solid halogen-free flame retardants, e.g. comprising organic derivatives of phosphoric acid, phosphonic acid or phosphorous acid or salts of phosphoric acid and other materials aiding the flame retardant action, for example starch, cellulose, aluminum hydroxide, etc. The use according to the present invention of alcohols and halogen-free hydrocarbons as blowing agents (f) prevents the use of unnecessarily high amounts of hydrocarbon and thus makes an indirect contribution to reducing flammability. In general, it has been found to be advantageous to use from 5 to 50 parts by weight, preferably from 5 to 25 parts by weight, of the specified flame retardants per 100 parts by weight of the component (b).

For the purposes of the present invention, fillers, in particular reinforcing fillers, are the customary organic and inorganic fillers, reinforcements, weighting agents, agents for improving the abrasion behavior in paints, coating agents, etc., known per se. Specific examples are: inorganic fillers such as siliceous minerals, for example sheet silicates such as antigorite, serpentine, hornblendes, amphiboles, chrysotile, talc; metal oxides such as kaolin, aluminum oxides, titanium oxides and iron oxides, metal salts such as chalk, barite and inorganic pigments such as cadmium sulfide, zinc sulfide and also glass, etc. Preference is given to using kaolin (china clay), aluminum silicate and coprecipitates of barium sulfate and aluminum silicate, and also natural and synthetic fibrous minerals such as wollastonite, metal and in particular glass fibers of various lengths, which can be coated if desired. Examples of suitable organic fillers are: starch, carbon, melamine, rosin, cyclopentadienyl resins and graft polymers, and also cellulose fibers, polyamide, polyacrylonitrile, polyurethane, polyester fibers based on aromatic and/or aliphatic dicarboxylic esters and, in particular, carbon fibers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c), although the content of matts, nonwovens and woven fabrics of natural and synthetic fibers can reach values of up to 80%.

Details of the abovementioned and further starting materials may be found in the specialist literature, for example the monograph by H. J. Saunders and K. C. Frisch "High Polymers" volume XVI, Polyurethanes, parts 1 and 2, Interscience Publishers 1962 or 1964 or the abovementioned Kunststoffhandbuch, Polyurethane, volume VII, Carl Hanser Verlag, Munich, Vienna, 1st, 2nd and 3rd editions, 1966, 1983 and 1993.

To produce the rigid foams based on isocyanate, the organic and/or modified organic polyisocyanates (a), relatively high molecular weight compounds having at least two reactive hydrogen atoms (b) and, if desired, chain extenders and/or crosslinkers (c) are reacted in such amounts that the equivalence ratio of NCO groups of the polyisocyanates (a) to the sum of the reactive hydrogen atoms of the component (b) and, if used, (c) is 0.85–1.75:1, preferably 1.0–1.3:1 and in particular 1.1–1.2:1. If the rigid foams based on isocyanate contain at least some bonded isocyanurate groups, a ratio of NCO groups of the polyisocyanates (a) to the sum of the reactive hydrogen atoms of the component (b) and, if used, (c) of 1.5–60:1, preferably 3–8:1, is used.

The rigid foams based on isocyanate are advantageously produced by the one-shot process, for example by means of the high-pressure or low-pressure technique in open or closed molds, for example in metal molds. It has been found to be particularly advantageous to use the two-component process and to combine the formative components (b), (d), (e) and, if used, (c) and (f) into the component (A) and to use the organic polyisocyanates, modified polyisocyanates (a) or mixtures of said polyisocyanates and, if desired, blowing agent (d) as component (B).

The starting components are mixed at from 15° to 90° C., preferably from 20° to 60° C. and in particular from 20° to 35° C., and introduced into the open mold or, if desired, introduced under increased pressure into the closed mold. Mixing can be carried out mechanically by means of a stirrer or a stirring screw. The mold temperature is advantageously from 20° to 110° C., preferably from 30° to 60° C. and in particular from 45° to 50° C.

In closed molds, it is also possible to use more foam-forming reaction mixture than is necessary to completely fill the mold. This then gives compacted foes. Another variant of foam production which can likewise be used is the double transport band technique.

The rigid polyurethane foams or molded rigid foams produced by the process of the present invention have a density of from 0.02 to 0.75 g/cm$^3$, preferably from 0.025 to 0.24 g/cm$^3$ and in particular from 0.03 to 0.1 g/cm$^3$. They are particularly suitable as insulation material in the building and refrigeration appliance sectors, e.g. as intermediate layer for sandwich elements or for filling the housings of refrigerators and freezer chests with foam.

The following examples illustrate the invention. Examples 1 to 19 demonstrate the improved blowing action and the improved flow behavior when using blowing agent mixtures of the present invention comprising low-boiling alcohols and hydrocarbons in comparison with the sole use of low-boiling hydrocarbons. The other examples serve to show the effects on other important properties of the rigid foams based on isocyanate.

Example 1 (comparison) (pbm=parts by mass)

The polyol component, consisting of 65.3 pbm of a polyol based on sucrose/propylene oxide, OH number 440 mg KOH/g, 13.5 pbm of a polyol based on amine and polypropylene oxide/ethylene oxide, OH number 112 mg KOH/g, 4.5 pbm of a polyol based on propylene glycol/propylene oxide, OH number 250 mg KOH/g, 2.24 pbm of silicone stabilizer SR 321 (from OSi Specialties), 2.58 pbm of dimethylcyclohexylamine, 1.97 pbm of water and 9.91 pbm of cyclopentane, was intensively mixed with 124 pbm of raw MDI, NCO content 31.5% by mass.

The concentrations of the blowing agents, based on the total mass of the foaming mixture, were:

| water | 0.88% by mass |
| cyclopentane | 4.42% by mass. |

The foam produced had, freely foamed in a foaming beaker, a density ("beaker bulk density") of 31.8 kg/m$^3$. The start time/gel time/rise time were, in s: 11/49/76.
Hose test:

100 g of reacting mixture were placed directly after mixing of the components in a continuous hose made of a plastic film and having a diameter of 4.5 cm. The hose was clamped shut at one end and the foam length obtained in cm was used as a measure of the flowability. A result of 138.8 cm was measured. (The results of the hose test are in each case means of 2 or 3 measurements.)

Example 2 (according to the present invention)

A foam was produced as in Example 1, but with 6 pbm of methanol being additionally added to the polyol component.

The concentrations of the blowing agents, based on the total mass of the foaming mixture, were:

| water | 0.86% by mass |
| cyclopentane | 4.31% by mass |
| methanol | 2.61% by mass. |

The foam obtained had the following properties:

Density in the foaming beaker: 30.2 kg/m$^3$.

Hose test: 150.3 cm

Start time/gel time/rise time, in s: 9/28/45.

Despite a considerably lower gel time, the foam flowed better than that in Comparative Example 1.

Example 3 (according to the present invention)

A foam was produced as in Example 1, but with 6 pbm of isopropanol being additionally added to the polyol component.

The concentrations of the blowing agents, based on the total mass of the foaming mixture, were:

| water | 0.86% by mass |
| cyclopentane | 4.31% by mass |
| isopropanol | 2.61% by mass. |

The foam obained had the following properties:

Density in the foaming beaker: 30.5 kg/m$^3$

Hose test: 144.4 cm.

Example 4 (according to the present invention)

A foam was produced as in Example 1, but with 6 pbm of ethanol being additionally added to the polyol component.

The concentrations of the blowing agents, based on the total mass of the foaming mixture, were:

| water | 0.86% by mass |
| cyclopentane | 4.31% by mass |
| ethanol | 2.61% by mass. |

The foam obtained had the following properties:

Density in the foaming beaker: 30.3 kg/m$^3$

Hose test: 149.5 cm.

Example 5 (according to the present invention)

A foam was produced as in Example 1, but with 6 pbm of n-butanol being additionally added to the polyol component.

The concentrations of the blowing agents, based on the total mass of the foaming mixture, were:

| | |
|---|---|
| water | 0.86% by mass |
| cyclopentane | 4.31% by mass |
| n-butanol | 2.61% by mass. |

The foam obtained had the following properties:
Density in the foaming beaker: 28.0 kg/m³
Hose test: 145.3 cm.

Example 6 (comparison)

The polyol component described in Example 1 is foamed in slightly altered form using n-pentane and water.

The polyol component, consisting of 63.4 pbm of a polyol based on sucrose/propylene oxide, OH number 440 mg KOH/g, 13.11 pbm of a polyol based on amine and propylene oxide/ethylene oxide, OH number 112 mg KOH/g, 4.37 pbm of a polyol based on propylene glycol/propylene oxide, OH number 250 mg KOH/g, 2.17 pbm of silicone stabilizer as described in Example 1.

2.51 pbm of dimethylcyclohexylamine, 1.91 pbm of water and 12.53 pbm of n-pentane, was intensively mixed with 120.7 pbm of raw MDI, NCO content 31.5% by mass.

The concentrations of the blowing agents, based on the total mass of the foaming mixture, were:

| | |
|---|---|
| water | 0.87% by mass |
| n-pentane | 5.69% by mass. |

The foam obtained had, freely foamed in the foaming beaker, a density of 26.8 kg/m³. The hose test gave 181.1 cm.

Example 7 (according to the present invention)

A foam was produced as in Example 6, but with 6 pbm of isopropanol being additionally added to the polyol component.

The concentrations of the blowing agents, based on the total mass of the foaming mixture, were:

| | |
|---|---|
| water | 0.84% by mass |
| n-pentane | 5.53% by mass |
| isopropanol | 2.65% by mass. |

The foam obtained had the following properties:
Density in the foaming beaker: 26.5 kg/m³
Hose test: 190.2 cm.

Despite the very strong blowing action of the n-pentane itself (greater amount, higher vapor pressure compared with cyclopentane), the isopropanol gives an additional blowing effect and significantly increased flow.

Example 8 (comparison)

A foam was produced as in Example 6, but with 12.53 pbm of isopentane in place of 12.53 pbm of n-pentane being added to the polyol component.

The concentrations of the blowing agents, based on the total mass of the foaming mixture, were:

| | |
|---|---|
| water | 0.87% by mass |
| isopentane | 5.69% by mass. |

The foam obtained had the following properties:
Density in the foaming beaker: 27.0 kg/m³
Hose test: 177.6 cm.

Example 9 (according to the present invention)

A foam was produced as in Example 8, but with 6 pbm of isopropanol being additionally added to the polyol component.

The concentrations of the blowing agents, based on the total mass of the foaming mixture, were:

| | |
|---|---|
| water | 0.84% by mass |
| isopentane | 5.53% by mass |
| isopropanol | 2.65% by mass. |

The foam obtained had the following properties:
Density in the foaming beaker: 24.8 kg/m³
Hose test: 190.6 cm.

Example 10 (comparison)

A foam was produced as in Example 6, but with 9.62 pbm of cyclopentane and 2.91 pbm of n-pentane in place of 12.53 pbm of n-pentane alone being added to the polyol component.

The concentrations of the blowing agents, based on the total mass of the foaming mixture, where:

| | |
|---|---|
| water | 0.87% by mass |
| cyclopentane | 4.36% by mass |
| n-pentane | 1.32% by mass. |

The foam obtained had the following properties:
Density in the foaming beaker: 28.0 kg/m³
Hose test: 176.2 cm.

Example 11 (according to the present invention)

A foam was produced as in Example 10, but with 6 pbm of isopropanol being additionally added to the polyol component.

The concentrations of the blowing agents, based on the total mass of the foaming mixture, were:

| | |
|---|---|
| water | 0.84% by mass |
| cyclopentane | 4.24% by mass |
| n-pentane | 1.28% by mass |
| isopropanol | 2.65% by mass. |

The foam obtained had the following properties:
Density in the foaming beaker: 26.7 kg/m³
Hose test: 182.5 cm.

Example 12 (comparison)

A foam was produced as in Example 6, but with 9.62 pbm of cyclopentane and 2.91 pbm of cyclohexane in place of 12.53 pbm of n-pentane being added to the polyol component.

The concentrations of the blowing agents, based on the total mass of the foaming mixture, were:

| water | 0.87% by mass |
|---|---|
| cyclopentane | 4.36% by mass |
| cyclohexane | 1.32% by mass. |

The foam obtained had the following properties:
Density in the foaming beaker: 28.9 kg/m$^3$
Hose test: 166.6 cm.

Example 13 (according to the present invention)

A foam was produced as in Example 12, but with 6 pbm of isopropanol being additionally added to the polyol component.

The concentrations of the blowing agents, based on the total mass of the foaming mixture, were:

| water | 0.84% by mass |
|---|---|
| cyclopentane | 4.24% by mass |
| cyclohexane | 1.28% by mass |
| isopropanol | 2.65% by mass. |

The foam obtained had the following properties:
Density in the foaming beaker: 28.5 kg/m$^3$
Hose test: 177.1 cm.

Example 14 (comparison)

A foam was produced as in Example 6, but with 5.88 pbm of cyclopentane and 5.88 pbm of isopentane in place of 12.53 pbm of n-pentane being added to the polyol component.

The concentrations of the blowing agents, based on the total mass of the foaming mixture, were:

| water | 0.87% by mass |
|---|---|
| cyclopentane | 2.66% by mass |
| isopentane | 2.66% by mass. |

The foam obtained had the following properties:
Density in the foaming beaker: 28.2 kg/m$^3$
Hose test: 174.3 cm.

Example 15 (according to the present invention)

A foam was produced as in Example 14, but with 6 pbm of isopropanol being additionally added to the polyol component.

The concentrations of the blowing agents, based on the total mass of the foaming mixture, were:

| water | 0.85% by mass |
|---|---|
| cyclopentane | 2.59% by mass |
| isopentane | 2.59% by mass |
| isopropanol | 2.65% by mass. |

The foam obtained had the following properties:
Density in the foaming beaker: 26.7 kg/m$^3$
Hose test: 183.3 cm.

Example 16 (comparison)

A foam was produced as in Example 6, but with 8.82 pbm of cyclopentane and 2.94 pbm of n-heptane in place of 12.53 pbm of n-pentane being added to the polyol component.

The concentrations of the blowing agents, based on the total mass of the foaming mixture, were:

| water | 0.87% by mass |
|---|---|
| cyclopentane | 3.98% by mass |
| n-heptane | 1.33% by mass. |

The foam obtained had the following properties:
Density in the foaming beaker: 29.8 kg/m$^3$
Hose test: 155.3 cm.

Example 17 (according to the present invention)

A foam was produced as in Example 16, but with 6 pbm of isopropanol being additionally added to the polyol component.

The concentrations of the blowing agents, based on the total mass of the foaming mixture, were:

| water | 0.85% by mass |
|---|---|
| cyclopentane | 3.88% by mass |
| n-heptane | 1.29% by mass |
| isopropanol | 2.64% by mass. |

The foam obtained had the following properties:
Density in the foaming beaker: 28.3 kg/m$^3$
Hose test: 161.7 cm.

Example 18 (comparison)

The polyol component consisted of 51.9 pbm of a polyol based on sorbitol and propylene oxide, OH number 490 mg KOH/g, 18.5 pbm of a polyol based on amine and propylene oxide/ethylene oxide, OH number 400 mg KOH/g, 25.8 pbm of potato starch, 1.27 pbm of silicone stabilizer as described in Example 1, 1.12 pbm of dimethylcyclohexylamine and 1.41 pbm of water.

8.75 pbm of cyclopentane were added to 100 pbm of this polyol component. This mixture was subsequently stirred intensively with 158.5 pbm of MDI raw product, NCO content 31.5% by mass.

The concentrations of the blowing agents, based on the total mass of the foaming mixture, were:

| water | 0.51% by mass |
|---|---|
| cyclopentane | 3.11% by mass. |

The foam obtained had the following properties:
Density in the foaming beaker: 48.8 kg/m$^3$
Start time/gel time/rise time in s: 38/150/267
Hose test: 81.5 cm.

Example 19 (according to the present invention)

A foam was produced as in Example 18, but with 6 pbm of isopropanol being additionally added to the polyol component. The concentrations of the blowing agents, based on the total mass of the foaming mixture, were:

| water | 0.49% by mass |
| cyclopentane | 3.04% by mass |
| isopropanol | 2.27% by mass. |

The foam obtained had the following properties:
Density in the foaming beaker: 45.3 kg/m$^3$
Start time/gel time/rise time in s: 42/142/241
Hose test: 91.9 cm.

Despite a shorter gel time and smaller amounts of water/cyclopentane, the foam flows better than that in Comparative Example 18.

Example 20 (comparison)

The polyol component, consisting of 5.41 pbm of an adduct of propylene glycol and propylene oxide, OH number 250 mg KOH/g, 54.05 pbm of a mixture of nitrogen-containing polyols (adducts of ethylene oxide and propylene oxide with nitrogen compounds), OH number 440 mg KOH/g, 24.32 pbm of a polyol based on sucrose and propylene oxide, OH number 500 mg KOH/g, 1.62 pbm of dimethylcyclohexylamine, 2.7 pbm of silicone stabilizer as described in Example 1, 1.98 pbm of water and 9.92 pbm of cyclopentane, was intensively mixed with 132.4 pbm of raw MDI, NCO content 31.5% by mass, using a stirrer (index: 112).

The concentrations of the blowing agents, based on the total mass of the foaming mixture, were:

| water | 0.85% by mass |
| cyclopentane | 4.30% by mass. |

The foam obtained had the following properties:
Density in the foaming beaker: 32.0 kg/m$^3$
Hose test: 141.8 cm
Start time/gel time/rise time in s: 10/55/85.

Physical properties of the foam after foaming in a steel mold heated to 45° C. and having dimensions 400 mm×300 mm×80 mm (degree of overfilling: 1.11):

| Core density in kg/m$^3$: | 32.2 |
| Compressive strength in foaming direction in N/mm$^2$: | 0.12 |
| Compressive elastic modulus in foaming direction in N/mm$^2$: | 3.55 |
| Thermal conductivity (Hesto) in mW/mK: | 21.1 (immediate value) |
| Dimensional stability at −30° C., 24 h, in %: | 0.1/−0.1/0.0 |
| Dimensional stability at +80° C., 24 h, in %: | 0.0/0.2/0.2 |

Example 21 (according to the present invention)

4.24 pbm of methanol were added to the polyol component as described in Example 20. The amount of isocyanate was changed such that the amount of OH from the methanol was included in the index of 112, which was kept constant. So as to have the same percentage amounts of water and cyclopentane in the foaming mixture, the composition was changed as follows:

5.09 pbm of adduct of propylene glycol and propylene oxide, OH number 250 mg KOH/g, 50.87 pbm of a mixture of nitrogen-containing polyols (adducts of ethylene oxide and propylene oxide with nitrogen compounds), OH number 440 mg KOH/g, 22.89 pbm of polyol based on sucrose and propylene oxide, OH number 500 mg KOH/g, 1.52 pbm of dimethylcyclohexylamine, 2.54 pbm of silicone stabilizer as described in Example 1, 2.08 pbm of water, 10.77 pbm of cyclopentane, 4.24 pbm of methanol.

The polyol component was intensively mixed with 147.8 pbm of raw MDI, NCO content 31.5% by mass, using a stirrer (index: 112, methanol was included).

The concentrations of the blowing agents, based on the total mass of the foaming mixture, were:

| water | 0.84% by mass |
| cyclopentane | 4.30% by mass |
| methanol | 1.71% by mass. |

The foam obtained had the following properties:
Density in the foaming beaker: 29.2 kg/m$^3$
Hose test: 157.7 cm
Start time/gel time/rise time in s: 11/46/72.

Physical properties of the foam after foaming in a steel mold heated to 45° C. and having dimensions 400 mm×300 mm×80 mm (degree of overfilling: 1.3):

| Core density in kg/m$^3$: | 33.8 |
| Compressive strength in foaming direction in N/mm$^2$: (calculated for 32.2 kg/m$^3$: 0.17) | 0.18 |
| Compressive elastic modulus in foaming direction in N/mm$^2$: (calculated for 32.2 kg/m$^3$: 4.81) | 5.20 |
| Thermal conductivity (Hesto) in mW/mK: | 21.2 (immediate value) |
| Dimensional stability at −30° C., 24 h, in %: | 0.1/0.0/0.0 |
| Dimensional stability at +80° C., 24 h, in %: | 0.1/0.3/0.1 |

The increases in the compressive strength and the elastic modulus were significantly greater than those corresponding to the density increase from 32.2 to 33.8 kg/m$^3$.

The foaming mixture flowed better than the mixture in Comparative Example 20. The density in the beaker was lower.

Despite the lower gel and rise times, the flow performance was improved and the beaker density was lowered.

The compressive strength and compressive elastic modulus values for a density of 32.2 kg/m$^3$ were calculated from the density values for 33.8 kg/m$^3$ using the following relationship which is known to those skilled in the art:

$$(32.2/33.8)^{1.6} \times \text{measured value at 33.8 kg/m}^3 = \text{calculated value for a density of 32.2 kg/m}^3.$$

(The corresponding equation is given, for example, in Polyurethanes World Congress 1993, pages 234–240; S. B. Burns and E. L. Schmidt "The PIR/PUR Ratio: A Novel Trimer Conversion Test with High Correlation to the Factory Mutual Calorimeter for HCFC-141b Blown Polyisocyanurate Foams". This relationship can be used to check whether mechanical property changes are merely attributable to the density change or to changes in the properties of the rigid foam framework substance. In our case, the strength of the framework substance is improved, since, for example, the compressive strength value of 0.17 N/mm² calculated for 32.2 kg/m³ in the variant of the present invention is significantly higher than the measured value of 0.12 N/mm² at 32.2 kg/m³ in the comparative variant (Example 20).)

Example 22 (according to the present invention)

The procedure was as in Example 21, but with 8.08 pbm of ethanol being added in place of 4.24 pbm of methanol. The cyclopentane and water concentrations were again kept constant as was the index (112, ethanol included).

The concentrations of the blowing agents, based on the total mass of the foaming mixture, were:

| | |
|---|---|
| water | 0.84% by mass |
| cyclopentane | 4.3% by mass |
| ethanol | 3.23% by mass. |

The foam obtained had the following properties:
Density in the foaming beaker: 28.5 kg/m³
Hose test: 174.3 cm
Start time/gel time/rise time in s: 12/53/82.

Physical properties of the foam after foaming in a steel mold heated to 45° C. and having dimensions 400 mm×300 mm×80 mm (degree of overfilling 1.3):

| | |
|---|---|
| Core density in kg/m³: | 32.9 |
| Compressive strength in foaming direction in N/mm²: | 0.18 |
| (calculated for 32.2 kg/m³: 0.17) | |
| Compressive elastic modulus in foaming direction in N/mm²: | 5.09 |
| (calculated for 32.2 kg/m³: 4.92) | |
| Thermal conductivity (Hesto) in mW/mK: (immediate value) | 21.4 |
| Dimensional stability at −30° C., 24 h, in %: | 0.0/0.0/0.0 |
| Dimensional stability at +80° C., 24 h, in %: | −0.1/0.2/0.1 |

Compressive strength and compressive elastic modulus were significantly increased compared with Comparative Example 20. Despite lower gel and rise times, the foam mixture flowed better than in the Comparative Example.

Example 23 (according to the present invention)

The procedure was as in Example 20, but with 4.8 pbm of isopropanol being additionally added. The index (112, isopropanol included) was again kept constant.

The concentrations of the blowing agents, based on the total mass of the foaming mixture, were:

| | |
|---|---|
| water | 0.85% by mass |
| cyclopentane | 4.30% by mass |
| isopropanol | 1.98% by mass. |

The foam obtained had the following properties:
Density in the foaming beaker: 30.2 kg/m³
Hose test: 161.8 cm
Start time/gel time/rise time in s: 11/52/84.

Since, due to the addition of isopropanol, the gel and rise times were somewhat greater than in Example 20, a correction using an additional 0.4 pbm of catalyst mixture was made.

If the penetration force into the fresh foam is measured using a standardized pin having a diameter of 20 mm during the time period immediately after the rise time, starting at 3 minutes, as a measure of the subsequent hardening, the following values are obtained in comparison with the foam from Comparative Example 20:

| | Time (Minutes) | | | | |
|---|---|---|---|---|---|
| | 3 | 4 | 5 | 6 | 8 |
| Foam, Example 23, Penetration force in N: | 40.1 | 66.0 | 81.5 | 91.0 | 96.0 |
| Foam, Example 20, Penetration force in N: | 41.0 | 69.0 | 90.0 | 97.0 | 104.5 |

Although the gel time was comparable, the foam mixture according to the present invention flowed better, gave a lower density and the course of subsequent hardening was not adversely affected in comparison with the foam from Example 20, taking into account the lower density.

The influence of the density was estimated using a method similar to the description of the density dependence of mechanical data in Example 21, i.e. the values of the penetration force of Example 3 were corrected by the factor

| | Time (Minutes) | | | | |
|---|---|---|---|---|---|
| | 3 | 4 | 5 | 6 | 8 |
| Example 23, penetration force in N, corrected to 32 kg/m³ | 44.4 | 73.1 | 90.3 | 100.8 | 106.4 |

This correction shows that the course of subsequent hardening of the cell framework substance is not adversely affected, but rather is improved a little.

We claim:

1. A process for producing rigid foams based on isocyanate comprising reacting
   a) organic polyisocyanates, modified organic polyisocyanates or mixtures of organic and modified organic polyisocyanates with
   b) at least one compound containing at least two reactive hydrogen atoms and
   c) optionally chain extenders, crosslinkers, or mixtures of chain extenders and cross linkers,
   in the presence of
   d) blowing agents, and
   e) catalysts
wherein the blowing agent (d) comprises a mixture of at least one low boiling hydrocarbon having from 3 to 7 carbon atoms and a low molecular weight monohydric alcohol containing a primary or secondary hydroxyl group and having from 1 to 4 carbon atoms.

2. A process as claimed in claim 1, wherein the blowing agent further comprises carbon dioxide formed from water and isocyanate.

3. A process as claimed in claim 1, wherein the at least one low-boiling hydrocarbon having from 3 to 7 carbon atoms is used in an amount of from 0.1 to 12% by mass, based on the total amount of the foam.

4. A process as claimed in claim 1, wherein the low molecular weight monohydric alcohol is used in an amount of from 0.1 to 6% by mass, based on the total amount of the foam.

5. A process as claimed in claim 1, wherein the low-boiling hydrocarbon is cyclopentane.

6. A process as claimed in claim 1, wherein the low-boiling hydrocarbon is n-pentane.

7. A process as claimed in claim 1, wherein low-boiling hydrocarbon is isopentane.

8. A process as claimed in claim 1, wherein the low molecular weight monohydric alcohol is methanol.

9. A process as claimed in claim 1, wherein the low molecular weight monohydric alcohol is ethanol.

10. A process as claimed in claim 1, wherein the low molecular weight monohydric alcohol is n-propanol.

11. A process as claimed in claim 1, wherein the low molecular weight monohydric alcohol is isopropanol.

12. A process as claimed in claim 1, wherein the low molecular weight monohydric alcohol is an isomer of butanol.

13. A process as recited in claim 2, wherein the at least one low-boiling hydrocarbon is selected from the group consisting of cyclopentane, n-pentane, isopentane, and mixtures thereof.

14. A process as recited in claim 2, wherein the low molecular weight monohydric alcohol is selected from the group consisting of methanol ethanol, n-propanol, isopropanol, an isomer of butanol and mixtures thereof.

15. A process as recited in claim 3, wherein the at least one low-boiling hydrocarbon is selected from the group consisting of cyclopentane, n-pentane, isopentane, and mixtures thereof.

16. A process as recited in claim 3, wherein the low molecular weight monohydric alcohol is selected from the group consisting of methanol, ethanol, n-propanol, isopropanol, an isomer of butanol and mixtures thereof.

17. A process as recited in claim 4, wherein the at least one low-boiling hydrocarbon is selected from the group consisting of cyclopentane, n-pentane, isopentane, and mixtures thereof.

18. A process as recited in claim 4, wherein the low molecular weight monohydric alcohol is selected from the group consisting of methanol, ethanol, n-propanol, isopropanol, an isomer of butanol, and mixtures thereof.

* * * * *